United States Patent [19]
Kurita et al.

[11] Patent Number: 5,487,533
[45] Date of Patent: Jan. 30, 1996

[54] AUTOMATIC TRANSPORT VEHICLE WITH THREE-AXIS MOTION SENSING AND VIBRATION DAMPING

[75] Inventors: Yutaka Kurita; Yasushi Muragishi, both of Ise, Japan

[73] Assignee: Shinko Electric Co., Ltd., Japan

[21] Appl. No.: 252,912

[22] Filed: Jun. 2, 1994

[30] Foreign Application Priority Data

Jun. 4, 1993 [JP] Japan .................. 5-134965

[51] Int. Cl.$^6$ .................. B60P 7/16
[52] U.S. Cl. .................. 267/140.5; 188/267; 248/581; 248/604; 248/614
[58] Field of Search .................. 267/136, 140.15, 267/140.5, 75, 150; 188/378–380, 158, 161, 267; 180/300, 312, 902; 248/562, 581, 604, 614, 621

[56] References Cited

U.S. PATENT DOCUMENTS

| | | | |
|---|---|---|---|
| 2,685,425 | 8/1954 | Wallerstein, Jr. | 248/614 X |
| 4,265,328 | 5/1981 | Rowa et al. | 180/89.13 |
| 4,848,525 | 7/1989 | Jacot et al. | 267/136 X |

FOREIGN PATENT DOCUMENTS

| | | | |
|---|---|---|---|
| 0114757 | 8/1984 | European Pat. Off. . | |
| 0530075 | 3/1993 | European Pat. Off. . | |
| 0069839 | 3/1989 | Japan | 267/136 |
| 1131354 | 5/1989 | Japan | 188/267 |
| 2190640 | 7/1990 | Japan | 188/267 |
| 4004338 | 1/1992 | Japan | 188/267 |
| 4059465 | 2/1992 | Japan . | |
| 665079 | 1/1952 | United Kingdom . | |
| 90/14969 | 12/1990 | WIPO . | |

*Primary Examiner*—Josie A. Ballato
*Attorney, Agent, or Firm*—Scully, Scott, Murphy & Presser

[57] ABSTRACT

It is an object of the present invention to control and damp with as few actuators as possible, vibrations generated in various directions on the bed of an automatic transport vehicle employed in clean rooms and other facilities. The automatic transport vehicle of the present invention comprises a truck (1a) and bed (1b) elastically supported with respect to the truck, a plurality of actuators (36) installed between them with inclined lines of action, sensors (40) which detect acceleration in the direction of the lines of action of these actuators, vibrations being suppressed by controlling the driving force of the actuators in accordance with the acceleration detected by the sensors.

20 Claims, 15 Drawing Sheets

PRIOR ART

AUTOMATIC TRANSPORT VEHICLE WITH THREE-AXIS MOTION SENSING AND VIBRATION DAMPING

FIELD OF THE INVENTION

The present invention relates to automatic transport vehicles used in the transport of silicon wafers and other loads in clean rooms, and in particular, relates to the prevention of vibrations in automatic transport vehicles.

RELEVANT ART

As unmanned industrial vehicles, such as the aforementioned automatic transport vehicle, are not provided with suspension mechanisms such as those found in ordinary automobiles, they are inevitably subjected to vibrations and shocks due to unevenness on the road surface or track. In automatic transport vehicles used to transport loads in the above-mentioned clean rooms, it is therefore necessary to pay heed to the prevention of vibrations so that the vibrations do not produce chipping of the semiconductor wafers or other payloads. Japanese Patent Application, Laid-Open No. H4-59465 discloses details of examples of conventional vibration-prevention techniques used in such applications. We will explain the conventional vibration-prevention techniques outlined in this publication.

FIG. 15 is a diagram showing a first conventional example. Reference numeral 1 represents a carrier truck, and this carrier truck 1 is constructed such that damping rubber 2 is installed between truck body 1a and bed 1b as a spring component. The relationship between the vibration frequencies and vibration transmission ratio (the ratio of the displacement z0 of truck body 1a and the displacement z of load 3) for the vibrations produced in truck body 1a when load 3 is carried on the aforementioned bed 1b and the truck travels on grating 4 is shown in FIG. 16.

FIG. 16 shows how in passive damping systems such as in the above-mentioned first conventional example, the vibrations from truck 1a are absorbed through the vibration-isolating action of the aforementioned damping rubber 2 in the higher frequency region above the natural frequency of the vibrating system illustrated in FIG. 15.

FIG. 17 shows a second conventional example which is an improved version of the aforementioned first conventional example. This second conventional example employs an active system which attempts to suppress vibrations using actuators. In this conventional example, acceleration sensor 8 is fitted to bed 1b of truck 7, and electromagnets 9 and 10 are fitted to truck 1a so as to drive load 1b upwards and downwards. Vibrations in bed 1b are damped through the action of attractive or repulsive forces between truck 1a and bed 1b, controlled by electromagnets 9 and 10 according to the acceleration detected by acceleration sensor 8. As for electromagnets 9 and 10 in this feedback control system, the acceleration signal detected by acceleration sensor 8 is integrated in controller 11, thus calculating the speed of movement of bed 1b, and based on this result, the relative motion of truck 1a and bed 1b is controlled by controlling the amplification factor of amplifiers 12 and 13.

The third conventional example is also known as one in which the electromagnet of the aforementioned second conventional example is replaced by a DC solenoid.

FIG. 18 is a diagram of the fourth conventional example. In this fourth conventional example, one end of a leaf spring 18 is used to support one side of truck 1a, and the tip of this leaf spring is such that it abuts the lower face of bed 1b in a state of rest. A piezoelectric device 23 is affixed to the front and rear surfaces of the aforementioned leaf spring 18. This piezoelectric device 23 is driven by amplifier 13 which is controlled in accordance with the signals detected by acceleration sensor 8.

Furthermore, FIG. 19 is a diagram showing a fifth conventional example. This fifth conventional example is one in which a linear DC motor 15, which replaces the electromagnet of the aforementioned second conventional example, is used to actively suppress vibrations. The aforementioned linear DC motor 15 comprises moving coil 16 and permanent magnet 17. The aforementioned linear DC motor 15 is controlled in accordance with the acceleration detected by acceleration sensor 8 fitted to bed 1b of carrier truck 14.

Among the active vibration control techniques such as those described in the aforementioned second to fifth conventional examples, in the case of the second conventional example which uses electromagnets for instance, the damping effects shown in FIG. 21 can be achieved. That is to say, in contrast to the maximum amplitude of 0.9 mm shown in FIG. 20 for the first conventional example which employed damping rubber, a maximum amplitude of 30 μm can be attained with the second conventional example; it can thus be seen that the vibrations are suppressed by a factor of 1/30.

However, the techniques in the above-mentioned second to fifth conventional examples can exhibit a damping action with respect to vibrations in the vertical plane, or more specifically, relating to the three degrees of freedom of vertical motion, pitching, and rolling, but cannot damp vibrations in the horizontal plane, or more specifically, relating to the three degrees of freedom of back and forth motion, lateral motion, and yawing.

Also, if we attempt to actively damp vibrations in all directions, or to put it another way, with respect to all degrees of freedom of the object in question, it is an unavoidable fact that the number of actuators will increase greatly and the overall mechanism will become complex.

There is also the problem when DC solenoids, linear DC motors, piezoelectric actuators or other actuators are used wherein vibrations from these actuators themselves, in directions other than in the damping directions, are ultimately transmitted from the truck to the bed, inducing new vibrations.

SUMMARY OF THE INVENTION

The present invention is an automatic transport vehicle comprising a truck which is free to move on a road surface or track, a bed supported elastically on this truck, a sensor which detects vibrations produced in the aforementioned bed, at least three actuators controlled by virtue of said sensor and which displace the bed relative to the aforementioned truck, and a controller which controls said actuators in accordance with detection signals from the aforementioned sensor, and characterized in that the directions of action of the aforementioned actuators are turned in mutually differing directions inclined with respect to the line perpendicular to the horizontal plane which includes the aforementioned truck, and in that the aforementioned sensor detects vibrations in each of the displacement directions of the aforementioned plurality of actuators.

With the above-mentioned configuration, vibrations can be damped by controlling each actuator in accordance with the vibrations detected by the sensor to move the bed relative to the truck. In addition, because the directions of action of the aforementioned actuators are such that they are inclined at an angle to the vertical, the bed can be displaced in both vertical and horizontal directions by virtue of the vertical and horizontal components of the displacements of the actuators. It is therefore possible to actively control vibrations in relation to many degrees of freedom using the least number of actuators.

By symmetrically pairing the aforementioned actuators such that their lines of action point in directions to intersect with the perpendicular line which passes through the center of gravity of the truck, vibrations other than yawing in the six degrees of freedom of the bed in the three axial directions and around each axis can be damped because the displacement owing to the aforementioned actuators pushes and pulls in directions which intersect with the center of gravity.

By symmetrically pairing the aforementioned actuators such that their lines of action point in directions so as not to intersect with the perpendicular line which passes through the center of gravity of the truck, vibrations in all six degrees of freedom of the bed can be annulled because the displacement due to the aforementioned actuators pushes and pulls in directions which are shifted away from the center of gravity.

Furthermore, when the aforementioned bed is supported elastically by first damping rubber fitted between the aforementioned truck and bed, it is possible to passively damp vibrations at frequencies away from the natural frequency for instance, in addition to the aforementioned active damping.

Moreover, when second damping rubber is fitted between the aforementioned actuators and the aforementioned bed, it is possible to prevent vibrations arising from the operation of the actuators being transmitted to the bed.

Also, when an electromagnet is used as an actuator, and the driving current of this electromagnet is controlled in accordance with the gap between the electromagnet and a target, it is possible to make corrections to the damping power accompanying the bed's motion and exhibit a reasonable control capability because the excitation current is adjusted so as to respond to variations in the gap. By controlling the driving current of this electromagnet in accordance with the gap between the electromagnet and a target, it is possible to compensate for changes in the relationship between the current accompanying the variation in the gap and the magnetic force, and to achieve further excellent vibration-prevention effects.

EMBODIMENTS

Figure 1:
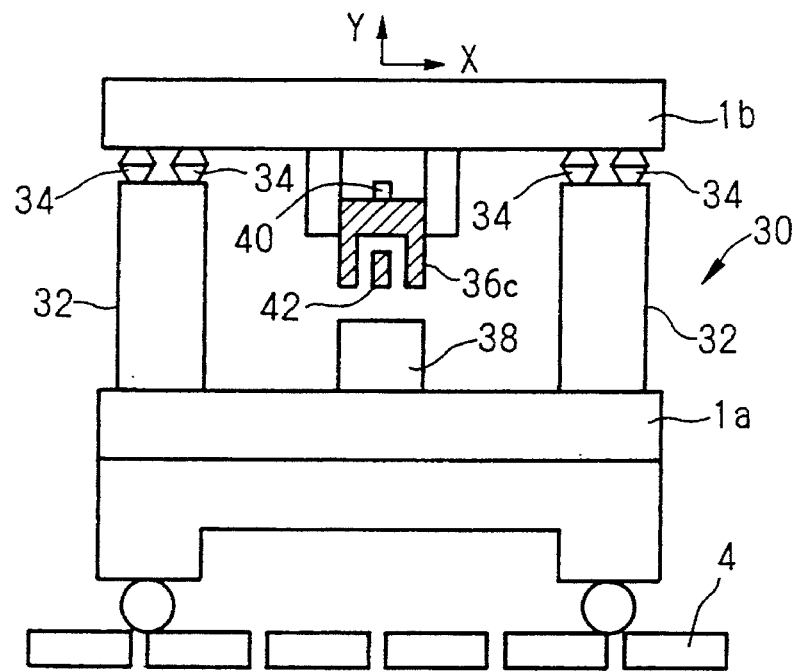
FIG. 1 is a front view of the first embodiment of a transport vehicle of the present invention.

FIGS. 1 to 4 show the first embodiments of the present invention. In the automatic transport vehicle in this embodiment, the symbols used are the same as those for parts in common with the conventional examples, and so the explanations thereof will be omitted.

Support pillars 32 are fitted at each of the four corners of truck 1a in automatic transport vehicle 30, and bed 1b is supported by these support pillars 32. First damping rubber 34 is positioned between each of the aforementioned support pillars 32 and bed 1b, and bed 1b is thereby elastically supported by damping rubber 34.

Actuators 36a to 36d are located at the front and rear, and on the left and right of the aforementioned bed 1b. As the drawing shows, those U-shaped electromagnets wound with 1,000 turns of wire on the yoke are employed as the actuators. Meanwhile, targets 38 made of ferromagnetic material in order to be subject to the magnetic force of aforementioned electromagnets 36a to 36d are mounted on the sides of truck 1a.

Figure 2:
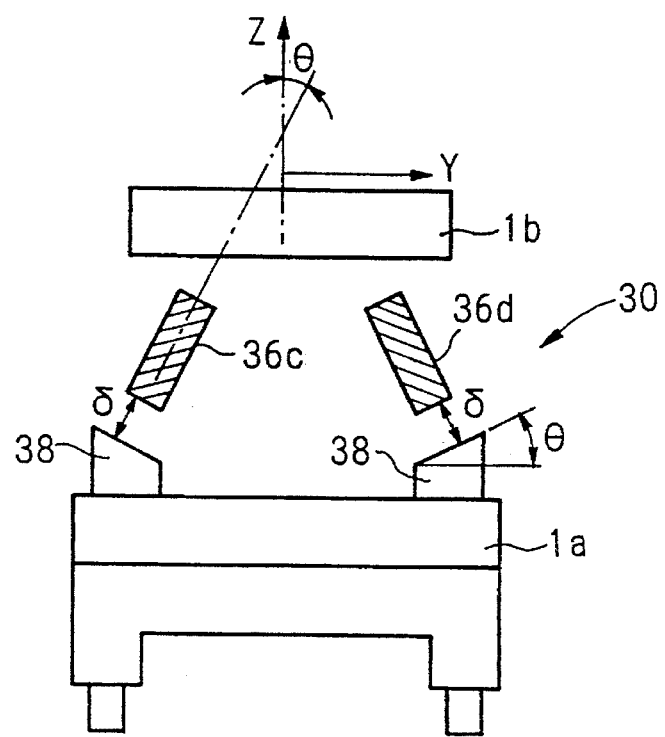
FIG. 2 is a side view of the transport vehicle in FIG. 1.
Figure 3:
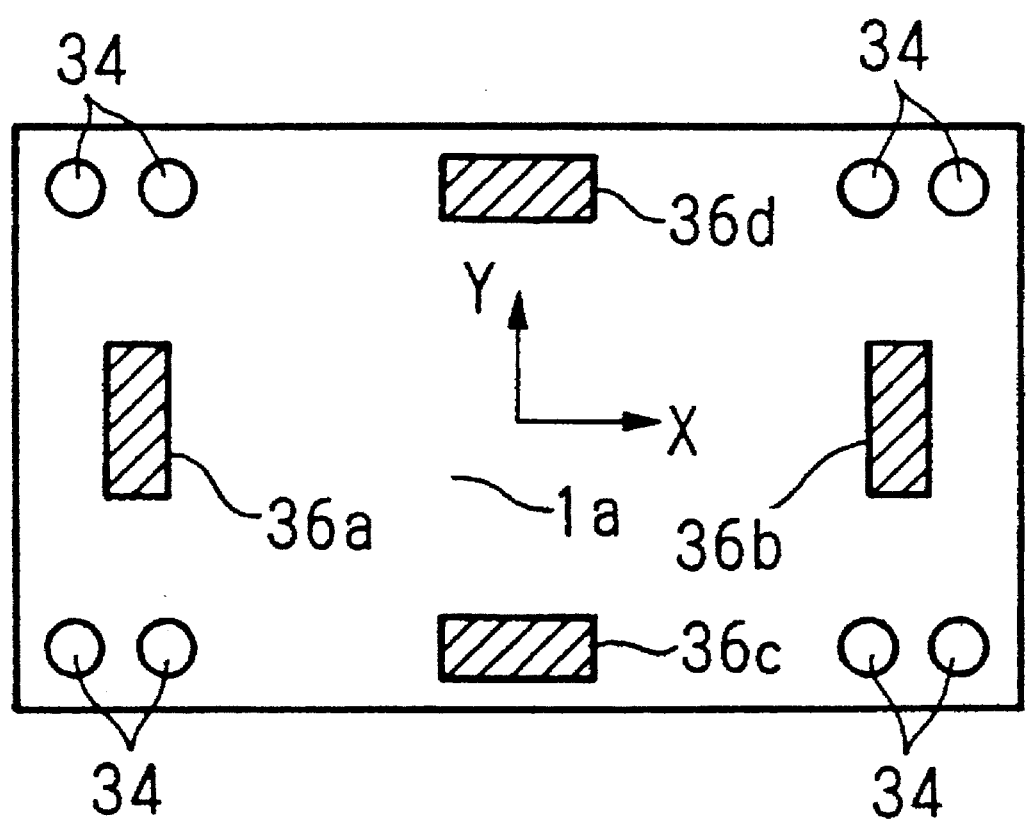
FIG. 3 is a plan view of the transport vehicle in FIG. 1.

In the plan view shown in FIG. 3, electromagnets 36a and 36b are disposed such that they are line symmetrical with respect to each other, and 36c and 36d are line symmetrical with respect to each other. As is also shown in FIG. 2, the pole surface of each electromagnet 36a to 36d is inclined such that they are turned outwards, and moreover, are facing in a direction such that their line of action intersects with the vertical line passing though the center of gravity of automatic transport vehicle 30. That is, as FIG. 2 shows, the inclination of the direction of action of each of the electromagnets 36a to 36d as actuators is θ=30° with respect to the perpendicular (Z-axis direction) to the plane containing the aforementioned truck 1a. Corresponding to the fact that electromagnets 36a to 36d are inclined in such a manner, the end surfaces of the aforementioned targets 38 are, as shown in the diagram, mounted such that they too are inclined at an equivalent angle Θ, thereby creating a fixed gap δ between them and the electromagnets, and thus a parallel magnetic field is formed between the electromagnets and the targets.

Acceleration sensors 40 are fitted to each of the aforementioned electromagnets 36a to 36d such that each detects the acceleration in the direction of action of each electromagnet 36a to 36d. In addition, changes in gap δ are detected by eddy current-type displacement detection sensors 42.

Acceleration sensors 40 detect vibrations in the direction of action of each actuator for the five degrees of freedom other than yawing in the above-mentioned transport vehicles. Additionally, the acceleration detected by each actuator is integrated by a control apparatus which will be described later (reference numeral 100 in FIG. 4), thus obtaining the vibrational speed in the direction of each actuator, and thereby individually controlling the driving current for the electromagnets which constitute actuators 36a to 36d. Vibrations in respect of the aforementioned five degrees of freedom can thereby be diminished.

On the basis of the displacement detected by the aforementioned displacement detection sensors 42, variations in the driving force for the electromagnets due to the gap δ are compensated. That is, when gap δ is large, it is compensated by increasing the value of the driving current in the feedback control in accordance with the aforementioned acceleration, and when gap δ is small, it is compensated by reducing the aforementioned driving current.

Figure 4:
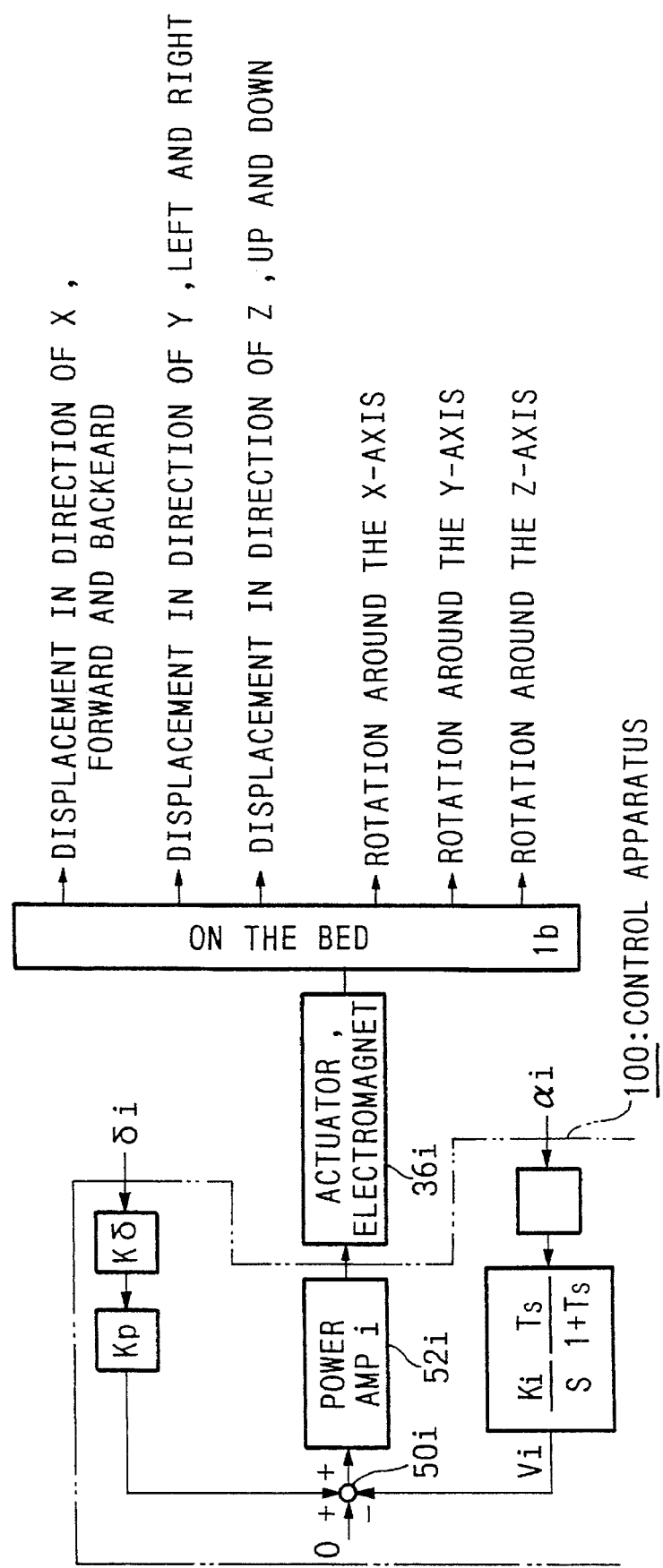
FIG. 4 is a control block diagram of the transport vehicle in FIG. 1.

A control block diagram for the above-mentioned control system is shown in FIG. 4. In the diagram, only the components of control apparatus 100 relating to the control of one actuator 36i are illustrated. After acceleration signal α in the direction of action of electromagnet 36i and provided by acceleration sensor 40i fitted to each electromagnet 36i is multiplied by acceleration sensor gain Ka, the DC component is filtered out using the calculation Ts/(1+Ts), and integrated using the calculation Ki/s, where Ki is a suitable gain factor for the particular actuator and 1/s is the Laplacian integral operator, thus obtaining speed signal Vi.

Meanwhile, gap δi between electromagnet 36i and target 38 provided by displacement detection sensor 42i is multiplied by gap sensor gain Kδ and, being multiplied by gain Kp in order to obtain the output required by the control system, is output as measured gap value si.

The aforementioned speed signal Vi and measured gap value δi are each input into calculator 50i. Additionally, speed signal Vi is subtracted from measured gap value δi by calculator 50i, and the result of this subtraction is amplified by power amp 52i, which then drives electromagnet 36i. Control apparatus 100 in the embodiment thus has a feedback loop which feeds the value of the acceleration of electromagnet 36i back into electromagnet 36i, and a feedback loop which feeds the size of the gap between electromagnet 36i and target 38 back into electromagnet 36i. As for the acceleration feedback, for motion in the direction in which the gap decreases in size, control is performed to reduce the driving voltage in accordance with the speed. As for the gap feedback, by virtue of motion in the direction in which the gap becomes smaller, because control is performed in the direction to reduce the driving voltage in response to the size of the gap to compensate for the accompanying increase in the attractive force, variations in the driving force of the electromagnet are connected in accordance with changes in the size of the gap.

By employing the above control, it is possible to suppress vibrations in five of the six degrees of freedom possessed by the bed 1b, that is, movement (sway) in the XY-direction (forward and backward, left and right), movement (bouncing) in the Z-direction (up and down), rotation around the X-axis (rolling), rotation around the Y-axis (pitching), and rotation around the Z-axis (yawing), except for yawing.

Specific examples of each control component are not limited to those shown in FIGS. 1 to 4. For example, it is possible to replace the acceleration sensors with displacement sensors which detect the displacement of bed 1b relative to truck 1a, and to perform the calculations corresponding to the characteristics of the data obtained in the control apparatus.

For the actuators, it is also acceptable to replace the aforementioned electromagnets with DC solenoids, linear DC motors, piezoelectric actuators or other devices with linear guide functions.

FIGS. 5 to 9 and FIG. 10 illustrate the results of vibration control experiments when active damping such as that described above is performed, and when damping control is not performed and vibrations are damped by a passive method using damping rubber only.

Figure 5:
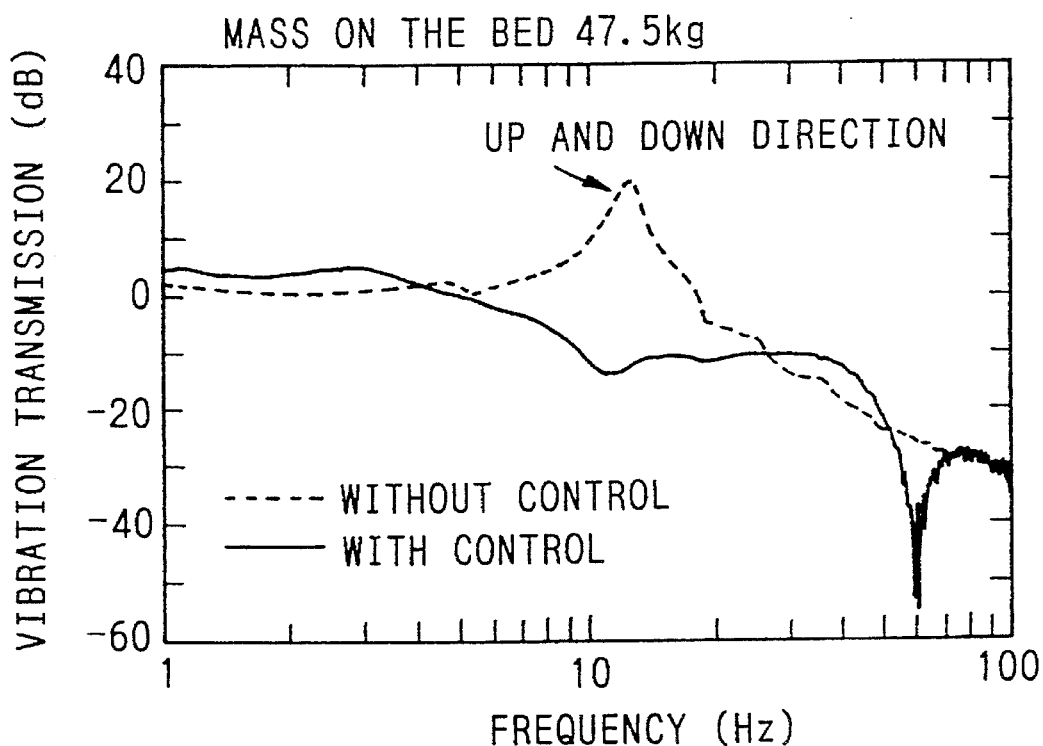
FIG. 5 is a chart showing the results of vibration damping experiments with the first embodiment.
Figure 6:
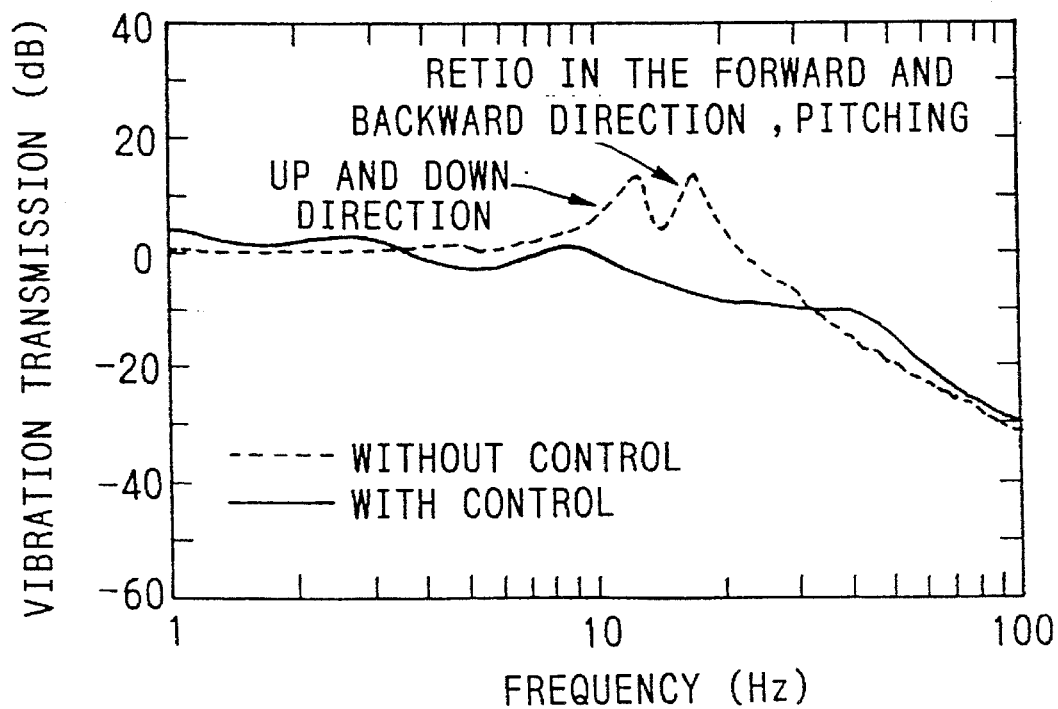
FIG. 6 is a chart showing the results of vibration damping experiments with the first embodiment.
Figure 7:
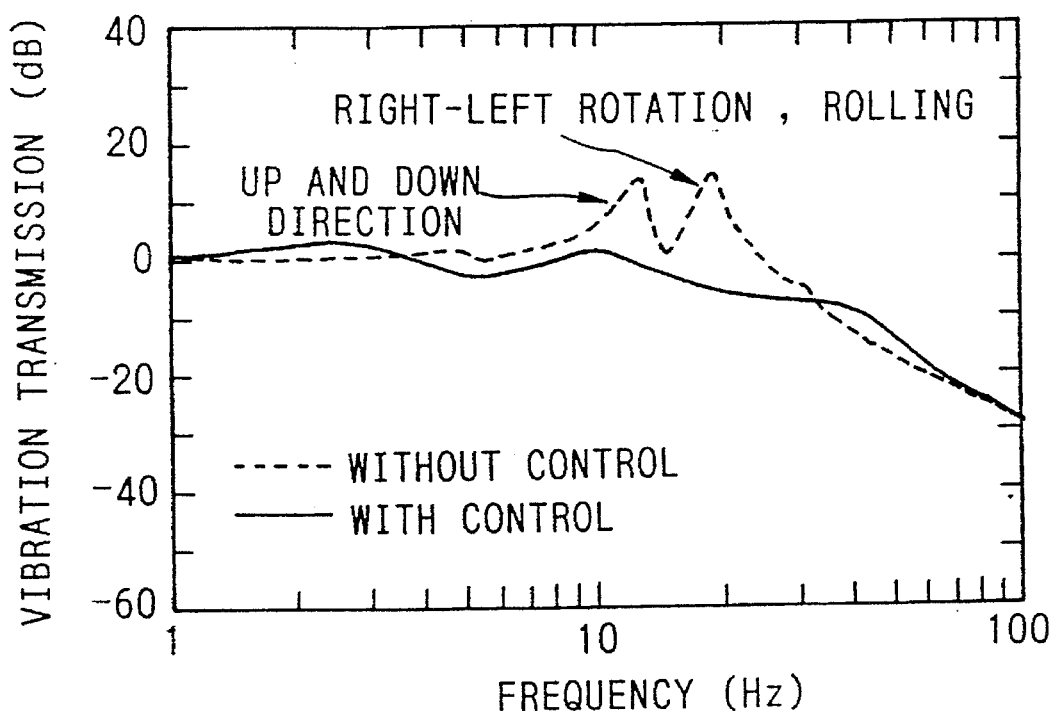
FIG. 7 is a chart showing the results of vibration damping experiments with the first embodiment.
Figure 8:
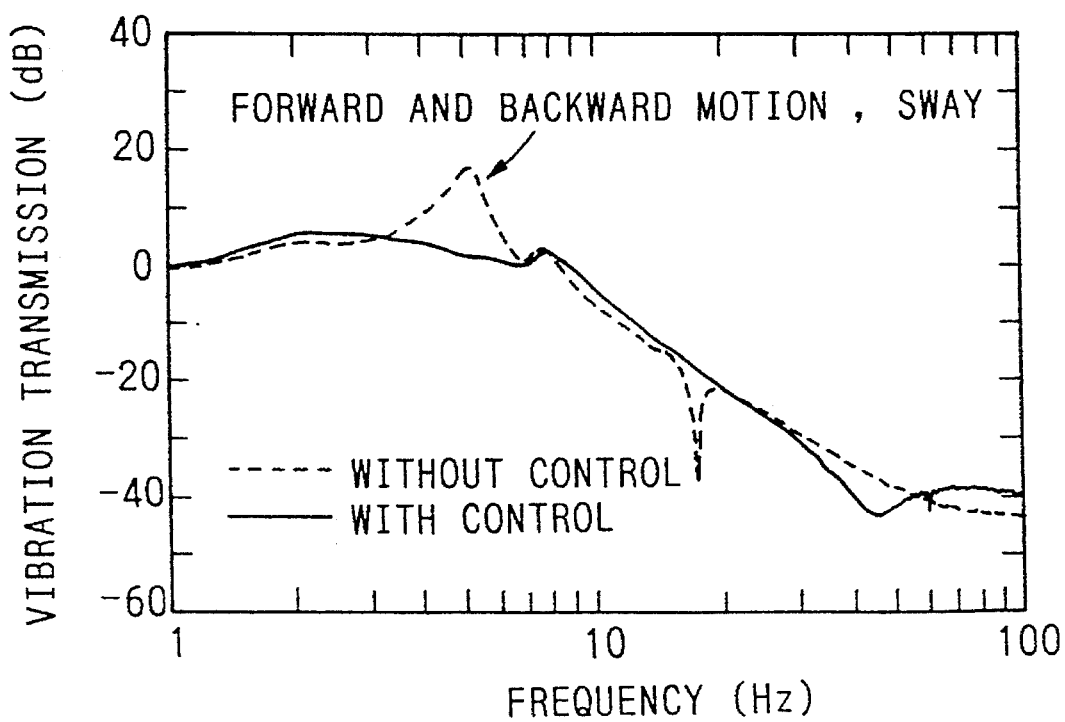
FIG. 8 is a chart showing the results of vibration damping experiments with the first embodiment.

The broken lines in these diagrams show the vibration transmission ratio when no control is performed and the solid lines the results when control is performed. FIG. 5 shows the results for motion in the vertical direction (bouncing), FIG. 6 for rotation in the forward and backward direction (pitching), FIG. 7 for right-left rotation (rolling), and FIG. 8 for forward and backward motion (sway). Two peaks corresponding to each of the natural vibrations are detected in FIG. 6 when control is not performed because of the effect of vibrations in the vertical direction in addition to vibrations relating to forward-backward rotation. Two peaks are also detected in FIG. 7 corresponding to each natural vibrations because of the effect of vibrations in the vertical direction in addition to those relating to right-left rotation when no control is performed.

In the experiments, the initial gap was adjusted such that gap δ would be 3 mm when a current of 0.5 A was passed through the coil of the electromagnet. The steady attractive force in this case was 25N. Experiments were conducted under these conditions on damping effects for a mass of 47.5 kg on the bed.

The experiments were conducted using vibrations produced by delivering a shock to the truck employing free fall. A vibration-damping mat was laid on an experimental surface upon which the apparatus was set up. Impulse-shaped vibrations were delivered by raising one end of the base below a spring which corresponds to the truck, and allowing it to fall freely. In addition, vibrations were measured using acceleration sensors installed at the same positions above and below the spring.

Figure 10A:
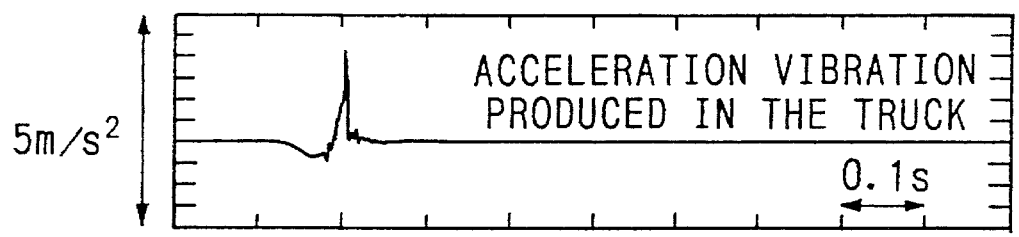
FIG. 10A through FIG. 10D are charts showing the results of vibration damping experiments with the first embodiment.
Figure 10B:
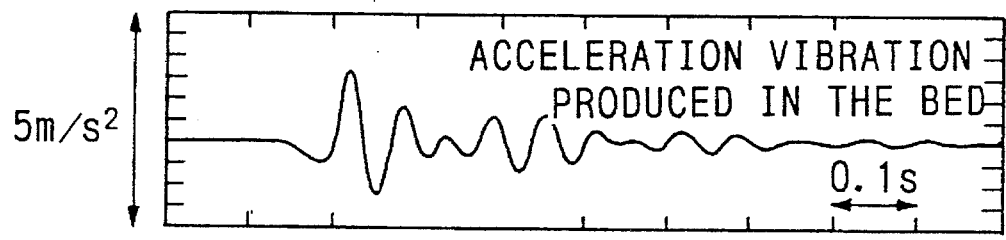

As is clear from FIGS. 10(a) and 10(b), an impulse-shaped acceleration produced in the truck in the non-controlled situation generated vibrations in the bed.

When we measure vibrations produced in this manner in the non-controlled case, the results shown by the broken lines in FIG. 5 to 8 were obtained. It can be seen from these results that excellent prevention effects are achieved using damping rubber alone in an adequately large frequency region above the natural frequency which corresponds to the maximum amplitude in the diagrams.

Figure 10C:
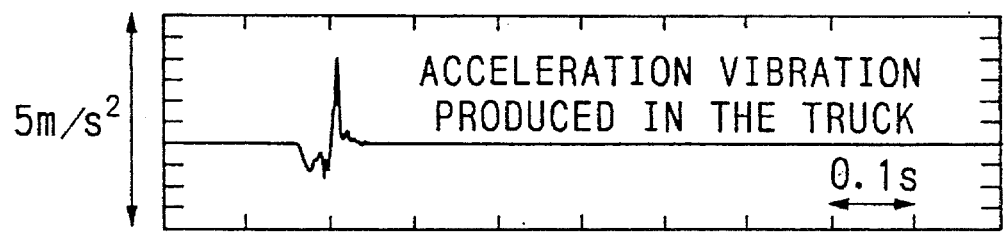
Figure 10D:
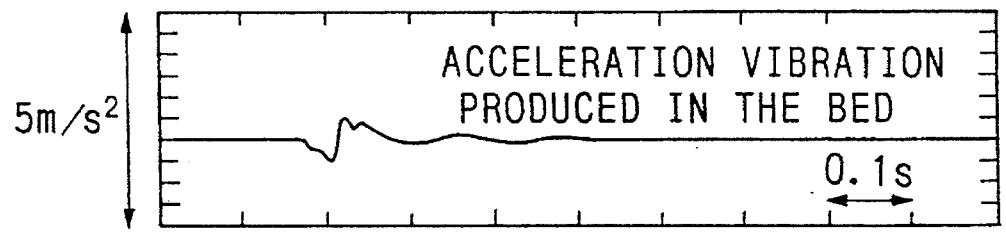

As shown in FIGS. 10(c) and 10(d) where vibrations are controlled, vibrations caused by impulse-shaped accelerations (as with FIG. 10(a)) produced in the truck are damped in the bed. In addition to damping the two natural mode vibrations, the immediate post-excitation peak is diminished when damping rubber alone is used.

When the vibrations produced in such a manner were analyzed, the results shown by the solid lines in FIGS. 5 to 8 were obtained. It can be seen from these results that the gain characteristic of the transmission function which displayed a peak in the vicinity of the natural frequency is lowered by 20 to 30 dB. That is, excessive vibrations due to resonance were suppressed.

To investigate variations in damping performance for various load weights, similar experiments were conducted with an additional load weight of 13.5 kg on the bed. When the gap δ was reduced from 3 mm to 2.7 mm due to the increased load weight, the steady current fell from 0.5 A to 0.37 A by virtue of the feedback control for the varying gap.

Figure 9:
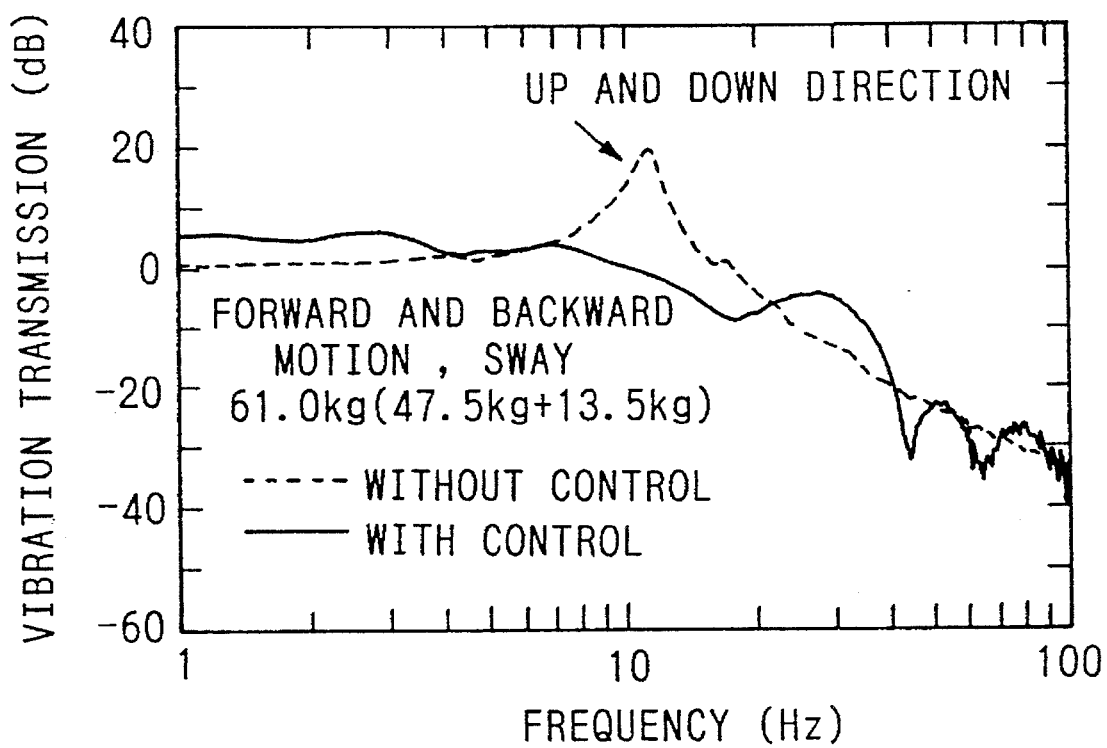
FIG. 9 is a chart showing the results of vibration damping experiments with the first embodiment.

The transmission function for this case is illustrated in FIG. 9. This diagram shows clearly that the peak in the vicinity of the natural frequency disappears even when the load weight is increased, and the resonance phenomenon is suppressed. Furthermore, compared with the case when the mass above the spring is smaller, the damping effects are diminished because the steady current is small.

Figure 11:
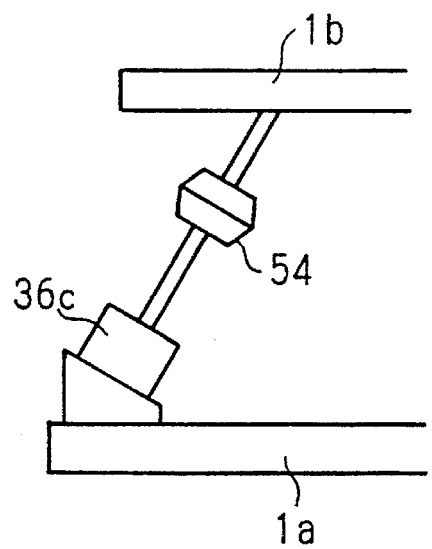
FIG. 11 is a front view of the essential components of the second embodiment.

When the electromagnet in the aforementioned first embodiment is replaced with an actuator having the linear guide functions described above, it is preferable that a configuration such as that in the second embodiment shown in FIG. 11 be employed for instance, because the transmission of vibrations in directions other than in the controlling force direction is blocked.

FIG. 11 shows the essential components of the second embodiment which employs the actuators described above. In this embodiment, damping rubber 54 is fitted between the operating component of actuators 36 and the bed 1b, and the transmission of vibrations in directions other than the operating direction of the actuators is blocked. By employing such a configuration, it is possible to prevent the production of secondary vibrations which accompany the damping action of the actuators.

Figure 12:
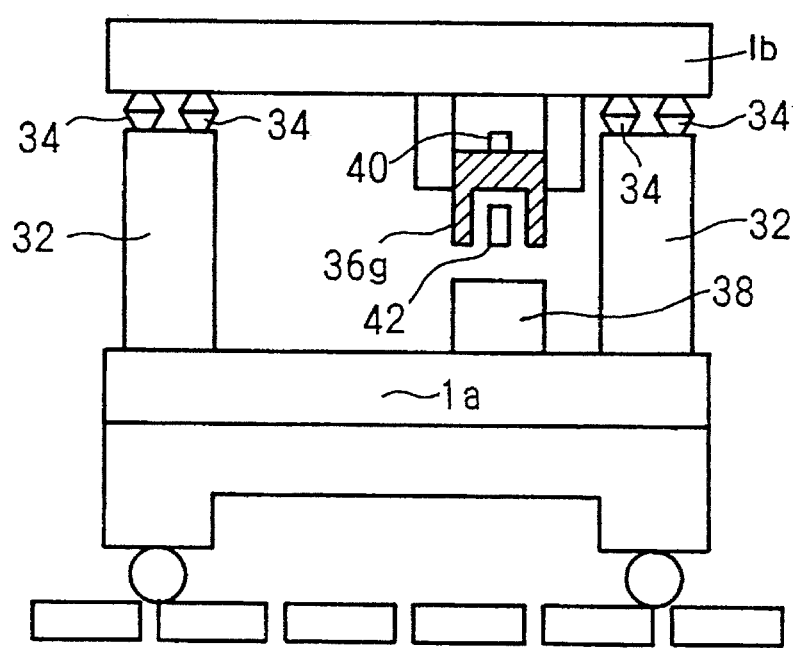
FIG. 12 is a front view of the third embodiment of the transport vehicle of the present invention.
Figure 13:
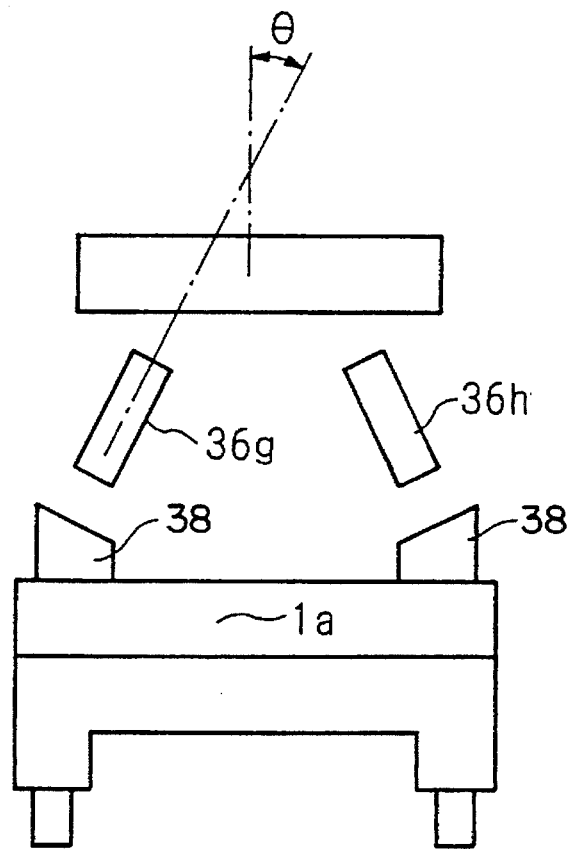
FIG. 13 is a side view of the transport vehicle in FIG. 12.
Figure 14:
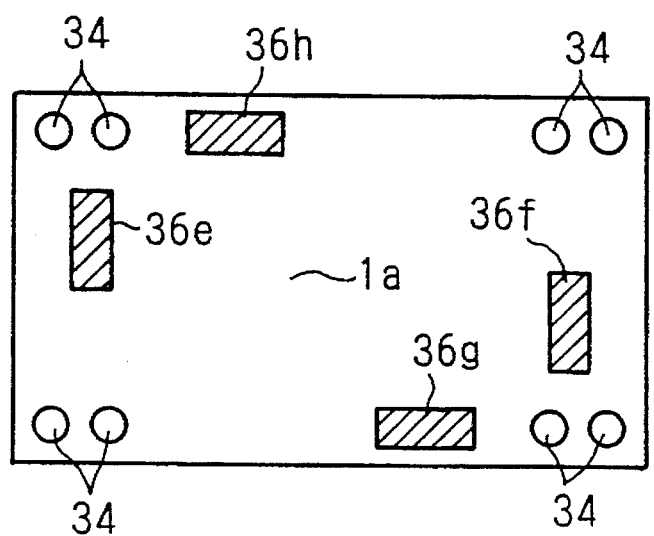
FIG. 14 is a plan view of the transport vehicle in FIG. 12.
Figure 15:
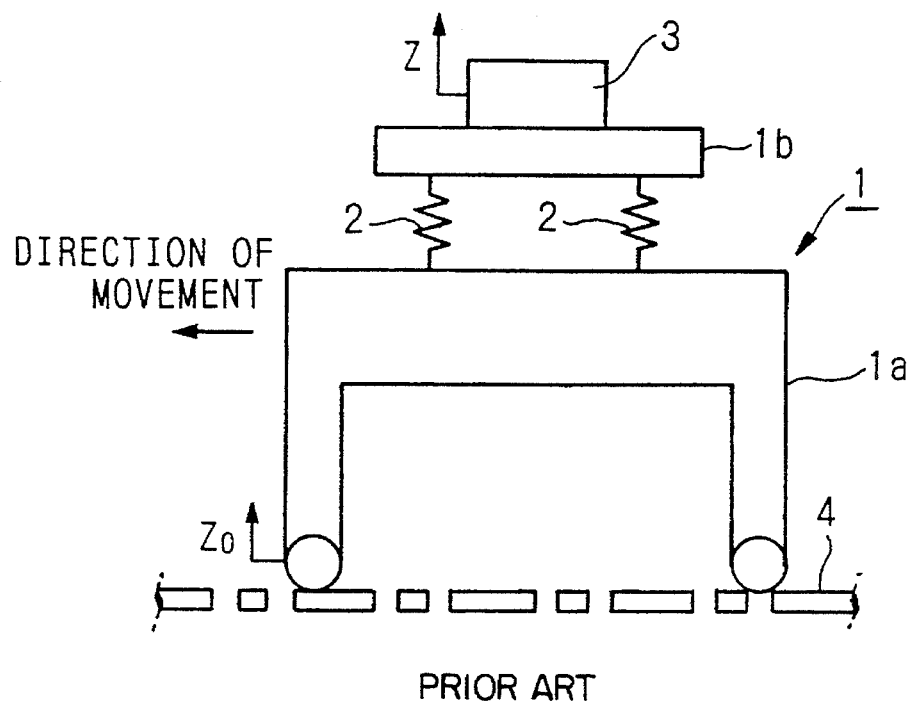
FIG. 15 is a front view of the transport vehicle of the first conventional example.
Figure 16:
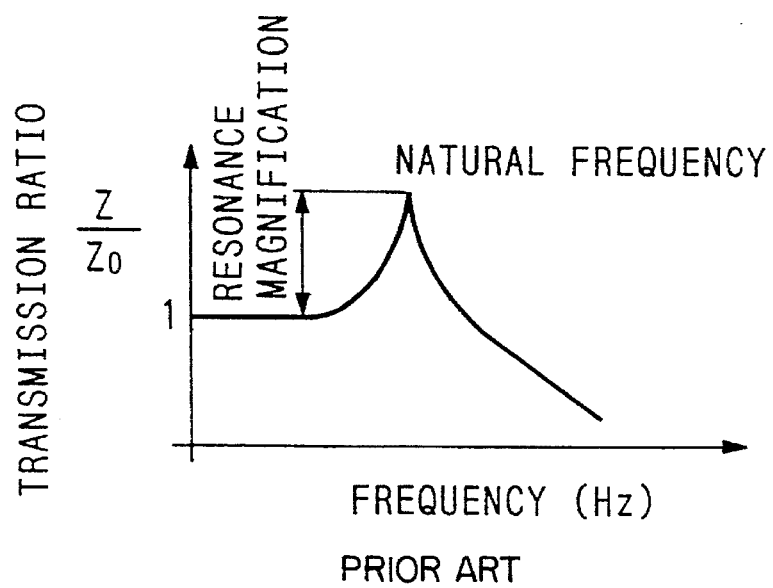
FIG. 16 is a chart showing the vibration characteristics of the apparatus in FIG. 15.
Figure 17:
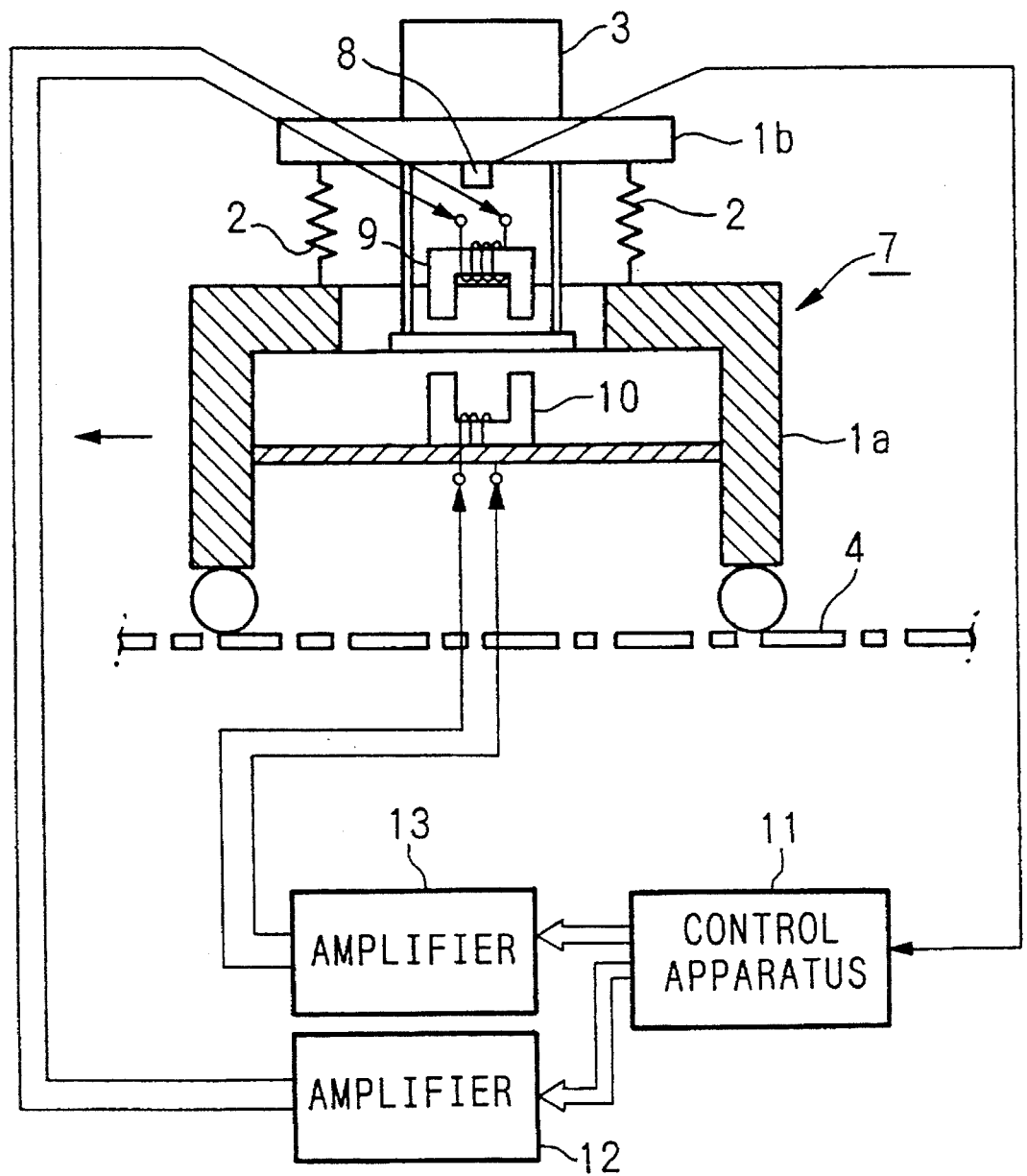
FIG. 17 is a front view of the transport vehicle of the second conventional example.
Figure 18:
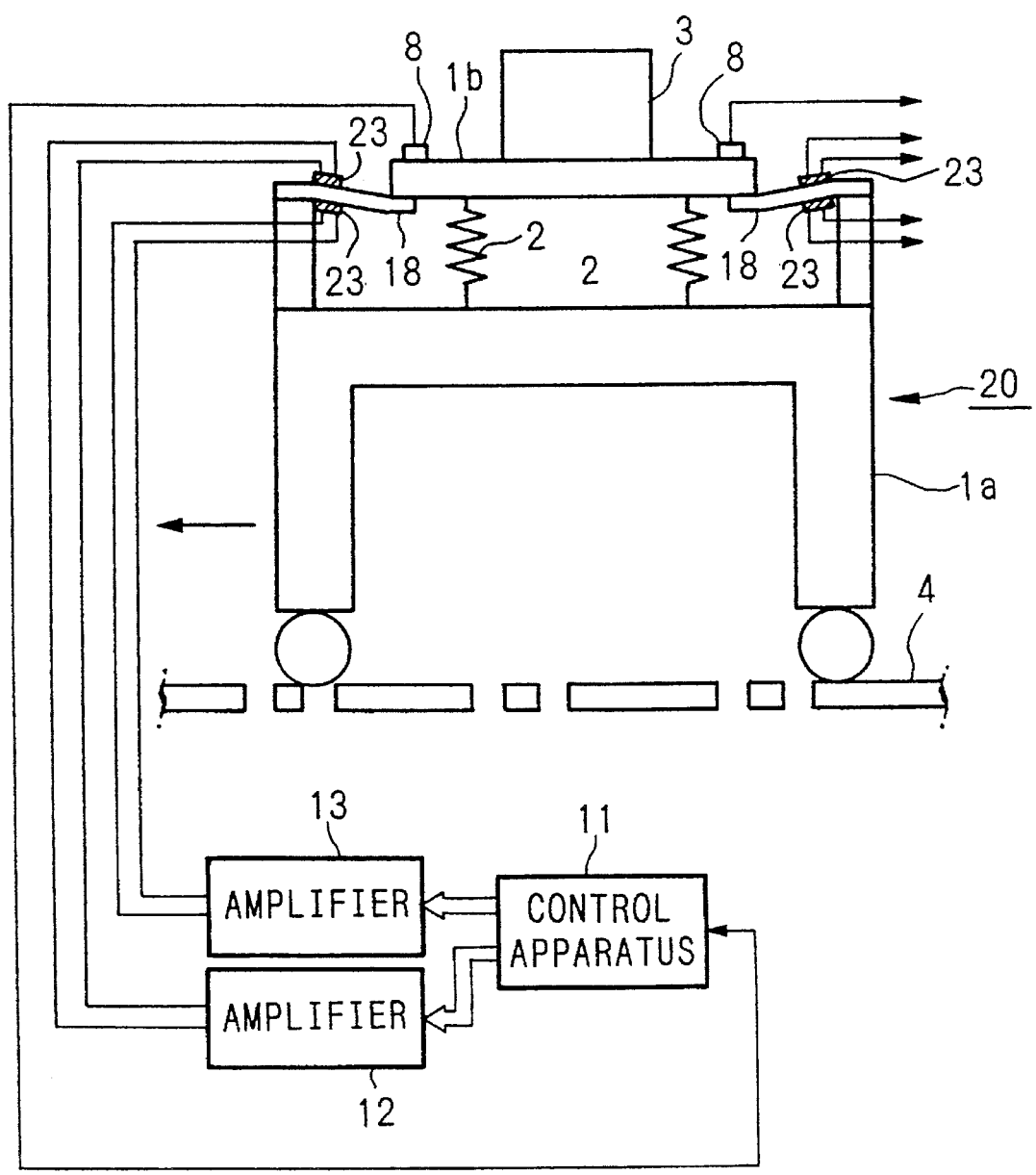
FIG. 18 is a front view of the transport vehicle of the fourth conventional example.
Figure 19:
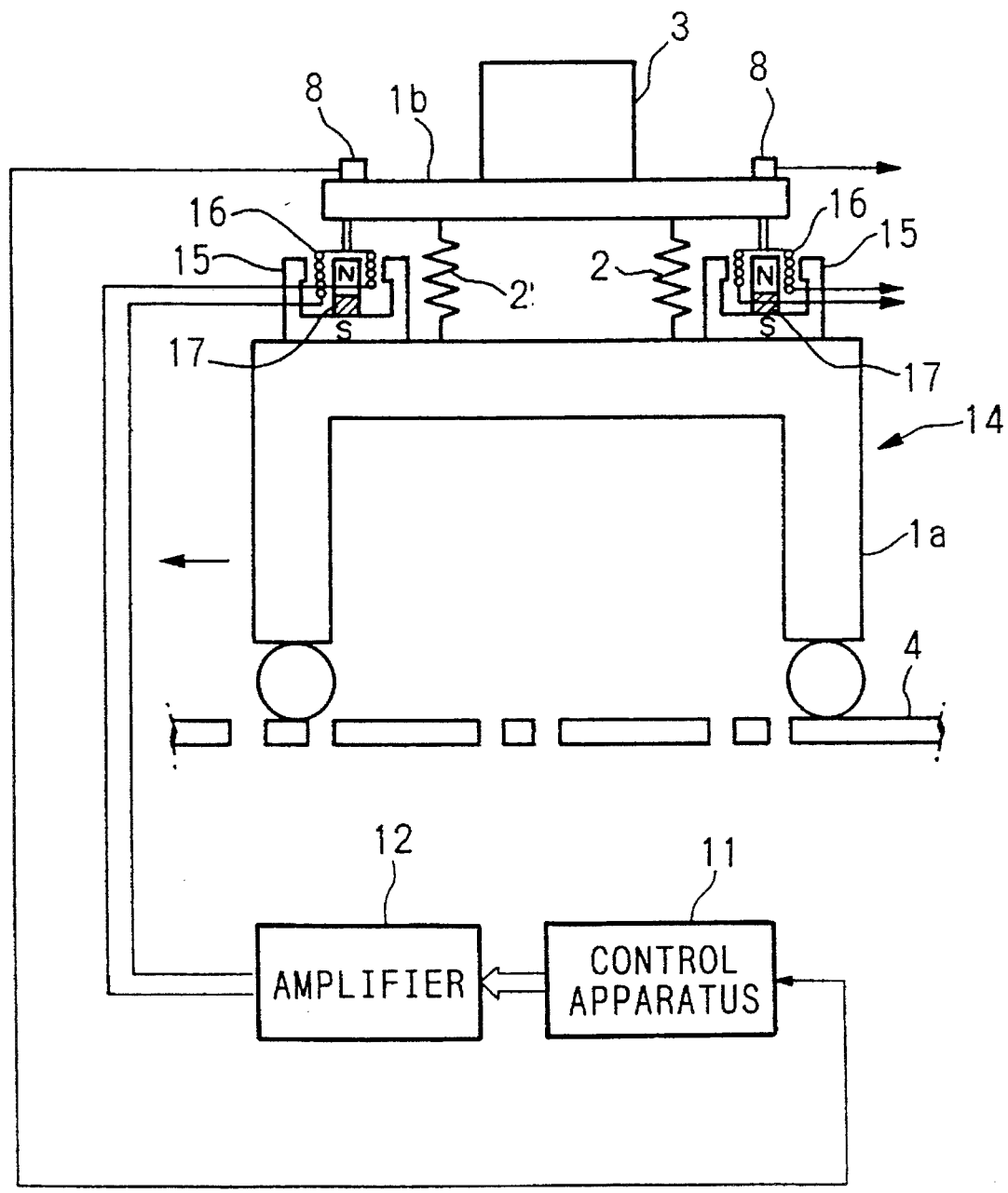
FIG. 19 is a front view of the transport vehicle of the fifth conventional example.
Figure 20:
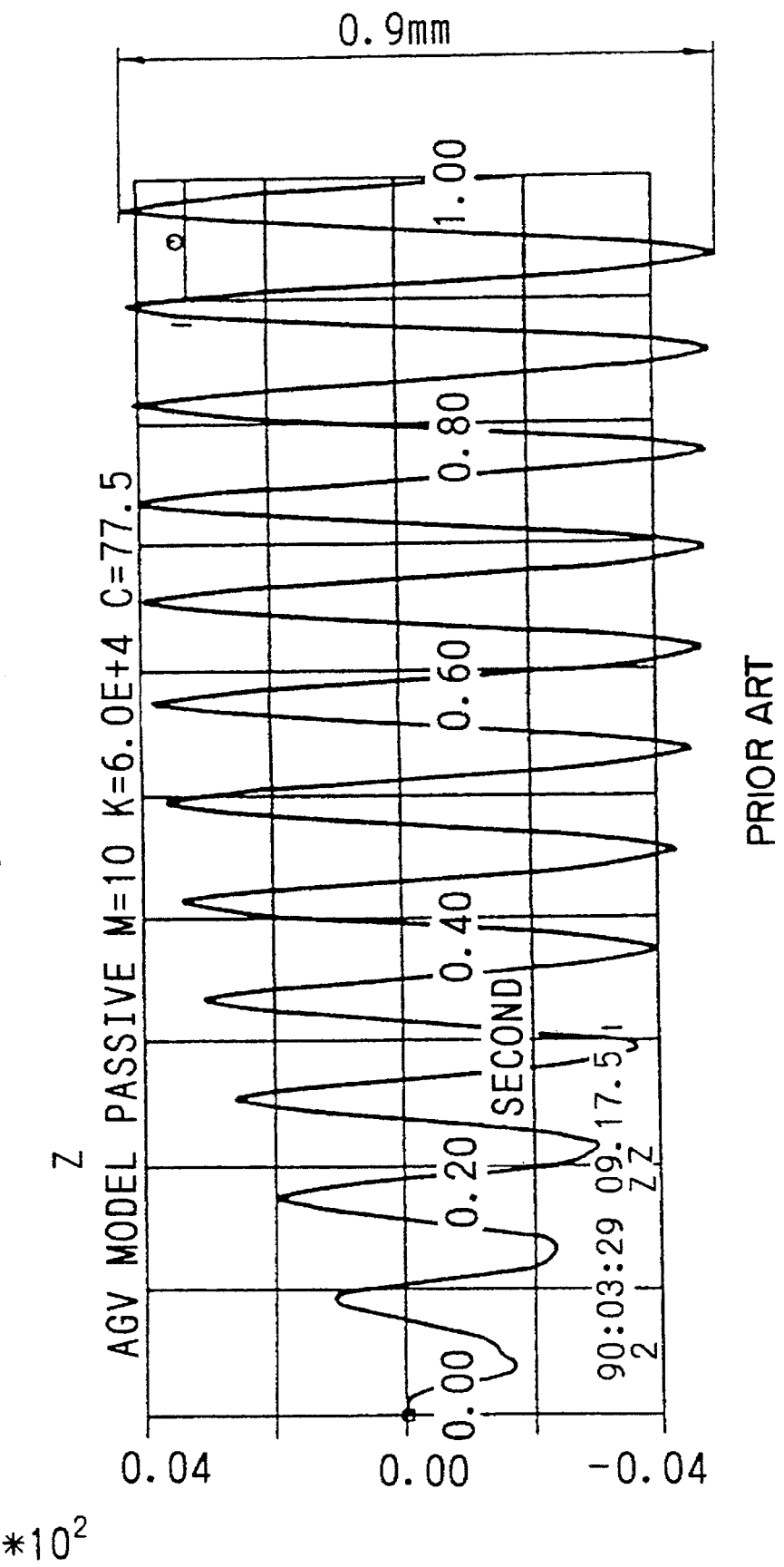
FIG. 20 is a chart showing the vibration characteristics of the conventional transport vehicle without control being undertaken.
Figure 21:
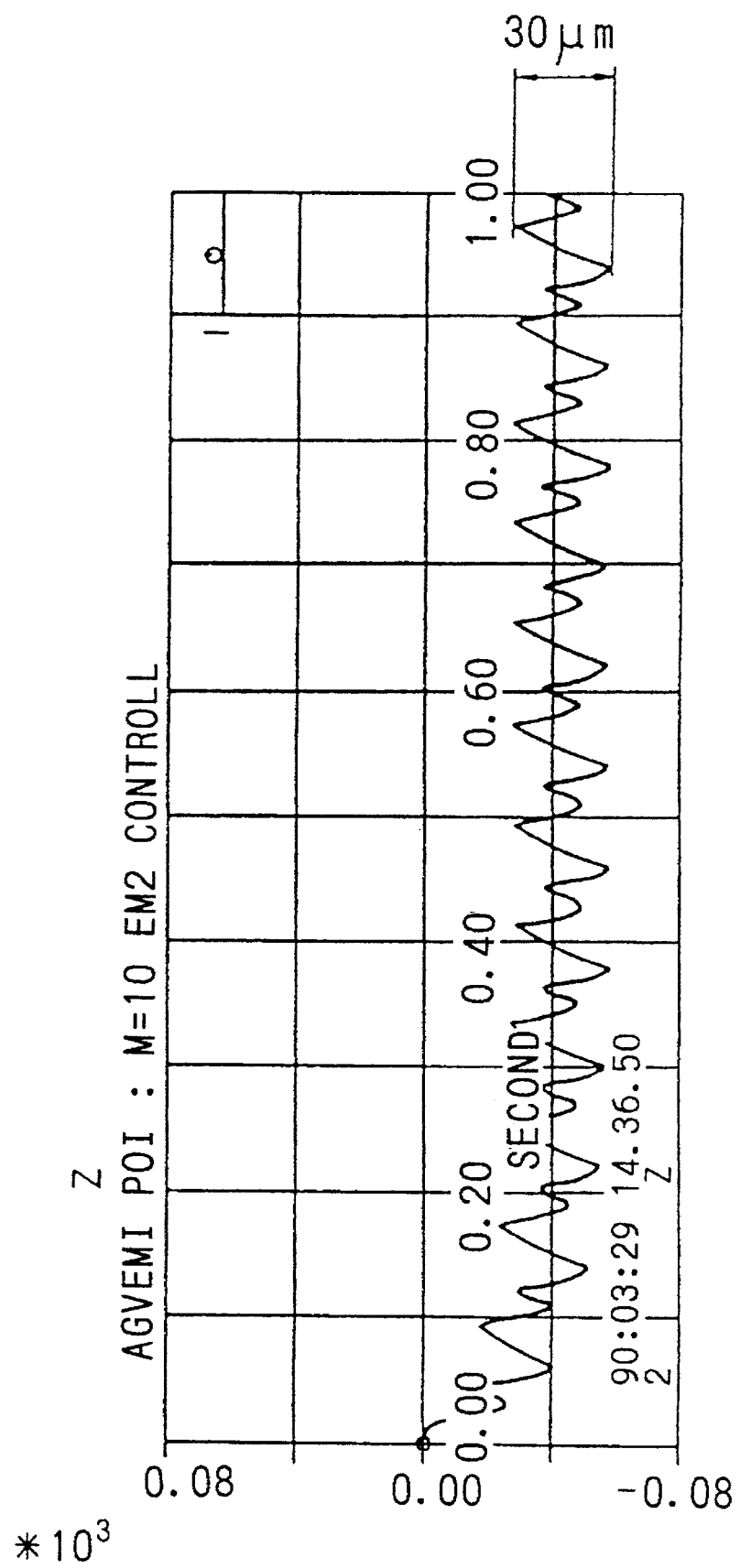
FIG. 21 is a chart showing the vibration characteristics of the conventional transport vehicle with control being undertaken.

FIGS. 12 to 14 are diagrams showing a third embodiment. This third embodiment differs in that the layout of the actuators differs from that of the first embodiment.

Actuators 36e to 36h are located in the front and rear, and on the left and right of aforementioned bed 1b. In this third embodiment too, electromagnets with the same components as in the first embodiment are employed. Meanwhile, targets 38 composed of ferromagnetic materials are fitted to the sides of truck 1a, so that they may be subjected to the magnetic force of the aforementioned electromagnets.

The aforementioned electromagnets 36a to 36d, and 36e, 36f, 36g, and 36h as shown in FIG. 14 are disposed in positions such that they are pointwise symmetrical about the center of gravity of bed 1b. As FIG. 14 shows, the pole surface of each electromagnet 36e to 36h is tilted and inclined such that it is facing outwards, and moreover, their lines of action are facing in directions that do not intersect with the vertical line passing through the center of gravity of automatic transport vehicle 30. Furthermore, the tilt angle of the actuators, as FIG. 14 shows, is such that θ=30° with respect to the perpendicular to the plane which includes the aforementioned truck 1a. Corresponding to such an inclination for each of these electromagnets 36e to 36h, the end faces of the targets 38 are also set on an inclined angle as shown in the diagram, thereby allowing the creation of a parallel magnetic field in the gap δ between the targets and the electromagnets.

By disposing each actuator 36e to 36h as described above, the lines of action of each of the actuators 36e to 36h do not cross at one point, and therefore, the four actuators 36e to 36h are able to control all six degrees of freedom.

What is claimed is:

1. An automatic transport vehicle capable of damping vibration of a load carried thereon, the vehicle comprising:

a truck which is freely movable on road surface or track;

a bed supported elastically on the truck;

sensors which detect vibrations in the bed and which output detection signals;

at least a first actuator which displaces the bed relative to the truck in a first direction through which a first sensor detects the vibration, a second actuator which displaces the bed relative to the truck in a second direction through which a second sensor detects the vibration, a third actuator which displaces the bed relative to the truck in a third direction through which a third sensor detects the vibration, and a controller which controls the actuators in response to detection signals from the sensors, wherein the directions of action of the actuators are inclined with respect to the perpendicular to a plane in which the truck moves, the directions of action of the actuators facing in mutually different directions, the sensors detecting vibrations in the direction of action of each of the actuators.

2. An automatic transport vehicle in accordance with claim, 1, wherein the directions of action of the actuators face in directions which intersect with the vertical line passing through the center of gravity of the truck and the actuators comprise two mutually symmetrical pairs.

3. An automatic transport vehicle in accordance with claim 2, wherein the bed is supported elastically by a first damping rubber installed between the truck and the bed.

4. An automatic transport vehicle in accordance with claim 3, wherein a second damping rubber is installed between the actuators and the bed.

5. An automatic transport vehicle in accordance with claim 3, wherein the actuators comprise electromagnets which are fitted to at least one of the truck or the bed and exert their magnetic force on at least one of the truck and the bed, and the controller controls the current driving the electromagnets according to measured distance between the electromagnets and the targets which are subject to magnetic force.

6. An automatic transport vehicle in accordance with claim 5, wherein a surface of a target which faces an electromagnet is perpendicular to the direction of action of the actuator.

7. An automatic transport vehicle in accordance with claim 2, wherein the actuators comprise electromagnets which are fitted to at least one of the truck or the bed and exert their magnetic force on at least one of the truck and the bed, and the controller controls the current driving the electromagnets according to measured distance between the electromagnets and the targets which are subject to the magnetic force.

8. An automatic transport vehicle in accordance with claim 1, wherein the directions of action of the actuators face in directions which do not intersect the vertical line passing through the center of gravity of the truck and the actuators comprise two mutually symmetrical pairs.

9. An automatic transport vehicle in accordance with claim 8, wherein the bed is supported elastically by a first damping rubber installed between the truck and the bed.

10. An automatic transport vehicle in accordance with claim 9, wherein a second damping rubber is installed between the actuators and the bed.

11. An automatic transport vehicle in accordance with claim 7, wherein the actuators comprise electromagnets which are fitted to at least one of the truck or the bed and exert their magnetic force on at least one of the truck and the bed, and the controller controls the current driving the electromagnets according to measured distance between the electromagnets and the targets which are subject to the magnetic force.

12. An automatic transport vehicle in accordance with claim 11, wherein a surface of a target which faces an electromagnet is perpendicular to the direction of action of the actuator.

13. An automatic transport vehicle in accordance with claim 9, wherein the actuators comprise electromagnets which are fitted to at least one of the truck or the bed and exert their magnetic force on at least one of the truck and the bed, and the controller controls the current driving the electromagnets according to measured distance between the electromagnets and the targets which are subject to the magnetic force.

14. An automatic transport vehicle in accordance with claim 13, wherein a surface of a target which faces an electromagnet is perpendicular to the direction of action of the actuator.

15. An automatic transport vehicle in accordance with claim 8, wherein the actuators comprise electromagnets which are fitted to at least one of the truck or the bed and exert their magnetic force on at least one of the truck and the bed, and the controller controls the current driving the electromagnets according to measured distance between the electromagnets and the targets which are subject to the magnetic force.

16. An automatic transport vehicle in accordance with claim 15, wherein a surface of a target which faces an electromagnet is perpendicular to the direction of action of the actuator.

17. An automatic transport vehicle in accordance with claim 1, wherein the bed is supported elastically by a first damping rubber installed between the truck and the bed.

18. An automatic transport vehicle in accordance with claim 17, wherein a second damping rubber is installed between the actuators and the bed.

19. An automatic transport vehicle in accordance with claim 17, wherein the actuators comprise electromagnets which are fitted to at least one of the truck or the bed and exert their magnetic force on at least one of the truck and the bed, and the controller controls the current driving the electromagnets according to measured distance between the electromagnets and the targets which are subject to the magnetic force.

20. An automatic transport vehicle in accordance with claim 1, wherein the actuators comprise electromagnets which are fitted to at least one of the truck and the bed and exert magnetic force on at least one of the truck and the bed, and the controller controls the current driving the electromagnets according to measured distance between the electromagnets and the targets which are subject to the magnetic force.

* * * * *